United States Patent [19]

Thompson

[11] 4,401,683
[45] Aug. 30, 1983

[54] **CARBOHYDRATE FOOD PRODUCTS RESISTANT TO *CLOSTRIDIUM BOTULINUM* AND THE FORMATION OF ENTEROTOXIN**

[75] Inventor: John S. Thompson, Wayne, Pa.

[73] Assignee: FMC Corporation, Philadelphia, Pa.

[21] Appl. No.: 280,188

[22] Filed: Jul. 6, 1981

[51] Int. Cl.$^3$ .......................... A23B 7/10; A23B 9/00; A23L 1/08; A23L 1/09

[52] U.S. Cl. .................................. 426/331; 426/335; 426/532; 426/615; 426/658; 426/801

[58] Field of Search ............... 426/321, 331, 333, 335, 426/532, 615, 654, 658, 801

[56] References Cited

U.S. PATENT DOCUMENTS

| | | |
|---|---|---|
| 1,687,270 | 10/1928 | Epstein . |
| 1,911,009 | 5/1933 | Woidich . |
| 3,003,883 | 10/1961 | Levy . |
| 3,258,345 | 6/1966 | Schack et al. . |
| 3,545,982 | 12/1970 | Nakatani et al. . |
| 3,792,177 | 2/1974 | Nakatani et al. ..................... 426/178 |
| 4,277,507 | 7/1981 | Thompson et al. ............ 426/335 X |
| 4,282,260 | 8/1981 | Jadlocki et al. ................ 426/335 X |

FOREIGN PATENT DOCUMENTS 2713259 9/1977 Fed. Rep. of Germany .
7709108 10/1977 France .

OTHER PUBLICATIONS

USDA Acts on the Bacon Dilemma: Alternatives Promise a Reprieve, Food Product Development, pp. 32 and 34–37, Jul. 1978, M. T. O'Brien.
Nitride Update: Search Intensifies for Bacon Curing Alternatives, S. Ranieri, Food Product Development, pp. 28 and 30, Oct. 1979.
Starter Culture Reduces Nitrite in Bacon, C. Andres, Food Processing, pp. 56–58, May 1979.
Data Sheet No. 806A, Published by Industrial Chemicals Division, Hooker Chemical Corporation, Niagara Falls, NY 14302, Date of Publication Unknown.

*Primary Examiner*—Arthur L. Corbin
*Attorney, Agent, or Firm*—Frank Ianno; Eugene G. Seems

[57] ABSTRACT

The growth of *Clostridium botulinum* and the formation of enterotoxin in carbohydrate food products, such as honey, is inhibited by adding to the carbohydrate food products an effective amount of a compound selected from the group consisting of hypophosphorous acid and its nontoxic water-soluble salts. Such additives may be present in combination with minor amounts, for example 40 ppm, of sodium nitrite.

13 Claims, No Drawings

CARBOHYDRATE FOOD PRODUCTS RESISTANT TO *CLOSTRIDIUM BOTULINUM* AND THE FORMATION OF ENTEROTOXIN

This invention relates to a composition which inhibits the growth of *Clostridium botulinum* in carbohydrate food products. Throughout the specification and claims the term "carbohydrate food products" will define a food characterized by a high carbohydrate content and a low protein and fat content such that the ratio of carbohydrate to protein and fat (C/P&F) is greater than 1. Meat, fish and poultry products are characterized by a low ratio of carbohydrate to protein and fat, that is, C/P&F is less than 1.

According to data from the Center for Disease Control, at least 139 cases of infant botulism have been identified in the United States since 1976. As a result of concern by the Food and Drug Administration over findings attributing infant botulism to some infant foods, with honey as a suspected product, the Food and Drug Administration selected several categories of infant foods for analysis. The products investigated included dry cereals, commercially canned fruits, commercially canned fruit juice, fresh cooked carrots, honey, corn syrup, dry commercial baby formula, regular cows milk, nonfat milk and sugar.

The survey was conducted after an initial survey in which the Food and Drug Administration sampled 24 infant food products to determine whether the products might be carriers of botulinum spores. In the original survey, 8 to 40 samples of corn syrups were found positive for spores. Food and Drug Administration officials are now analyzing data from a recent survey in which the agency found that 6 of 961 samples of corn syrups contained *Clostridium botulinum* spores. The preliminary data indicated that corn syrup could be a possible source of *Clostridium botulinum* spores.

In accordance with the present invention, the growth of *Clostridium botulinum* and the production of botulinal toxin is inhibited during the storage of carbohydrate food products by addition thereto of an effective amount of a compound selected from the group consisting of hypophosphorous acid and its nontoxic water-soluble salts, such as sodium and potassium hypophosphite, calcium hypophosphite, magnesium hypophosphite and manganese hypophosphite. Sodium hypophosphite is conveniently used in the form of its monohydrate, $NaH_2PO_2 \cdot H_2O$. Small amounts, that is, from about 40 ppm to about 120 ppm of sodium nitrite may also be present in the carbohydrate food product.

The amount of hypophosphite salt (or hypophosphorous acid) that is added may vary with the carbohydrate food, the particular hypophosphite salt and the presence or absence of sodium nitrite; and is effective in amounts of from about 500 to about 3000 parts per million. About 3000 parts per million of a hypophosphite salt is sufficient to inhibit or block the formation of enterotoxins from *Clostridium botulinum* if there is no nitrite in the carbohydrate product. One thousand parts per million of sodium hypophosphite is effective when as little as 40 parts per million of sodium nitrite is also present in the carbohydrate food product. As indicated above, the potassium, calcium, magnesium or manganese hypophosphite salts may be employed in similar amounts with good results. The choice of a particular hypophosphite salt will depend upon its cost and relative effectiveness, and the amount of hypophosphite salt may be reduced if sodium nitrite is also present in amounts between about 40 ppm and 120 ppm. Particularly preferred are carbohydrate food products containing from 2000 to about 3000 ppm of hypophosphorous acid or its nontoxic water-soluble salts. The combination of 40 ppm sodium nitrite with 1000 ppm of sodium hypophosphite is also highly effective.

In the practice of the present invention, the hypophosphorous acid (or its nontoxic salt) may be added to the carbohydrate food product in solution or solid form. The present invention has particular application to the processing of baby foods and infant formulas wherein the hazards of botulism are believed to be particularly great due to the small body weight of the baby and the lack of flora in the lower gut. Examples of such carbohydrate food products having a C/P&F fat ratio of more than 1 are listed in Table I. The addition of an effective amount, that is, about 1000 to about 3000 ppm of hypophosphorous acid or one of its nontoxic salts to such carbohydrate food products will inhibit the growth of *Clostridium botulinum* and the formation of enterotoxins.

The invention is further illustrated by the following examples which should not be considered as limitative of its scope.

EXAMPLE I

To 99.8 kg of light corn syrup is added with stirring 200 g (2000 ppm) of sodium hypophosphite. The mixture is heated to the boiling point and bottled hot in glass jars.

EXAMPLE II

To 99.95 kg of an aqueous sucrose solution (70° Brix) is added with stirring 50 g (500 ppm) of sodium hypophosphite. The mixture is heated to the boiling point and bottled hot.

EXAMPLE III

To 99.7 kg of strained clover honey is added with stirring 300 g (3000 ppm) of sodium hypophosphite. The mixture is heated to 240° F. (115.5° C.) for 3 minutes and bottled hot.

EXAMPLE IV

A dry rice cereal may be prepared by mixing thoroughly the following ingredients:

| Ingredient | Amount |
| --- | --- |
| Banana Puree | 33 kg |
| Rice Flour | 25 kg |
| Sucrose | 20 kg |
| Soya Protein Concentrate | 10 kg |
| Dextrose | 8 kg |
| Soya Oil | 1.7 kg |
| Calcium Carbonate | 1.0 kg |
| Soya Lecithin | 400 g |
| Sodium Hypophosphite | 300 g |
| Electrolytic Iron | 30 g |
| Niacinamide | 30 g |
| Riboflavin | 20 g |
| Thiamin | 20 g |

The product is packaged in cardboard boxes and protected from atmospheric moisture with a sealed paraffin coated paper barrier.

EXAMPLE V

A peach cobbler may be prepared by stirring together the following ingredients:

| | |
|---|---|
| Peaches | 45 kg |
| Water | 25 kg |
| Sugar | 20 kg |
| Corn Starch | 5 kg |
| Wheat Flour | 2.7 kg |
| Ascorbic Acid | 1.0 kg |
| Cinnamon Extract | 700 g |
| Citric Acid | 550 g |
| Sodium Hypophosphite | 50 g |

The mixture is heated to the boiling point and maintained at this temperature for 5 minutes. This product is packaged in glass jars while hot and the closed jars are heated to 240° F. (115.5° C.) in an autoclave and maintained at that temperature for 3 minutes.

EXAMPLE VI

A vanilla custard pudding may be prepared by stirring together the following ingredients:

| | |
|---|---|
| Water | 40 kg |
| Milk | 30 kg |
| Sugar | 20 kg |
| Corn Starch | 6.5 kg |
| Egg Yolks | 2.0 kg |
| Vanilla | 1.1 kg |
| Sodium Hypophosphite | 300 g |

The mixture is heated at 143°–145° F. (61.2°–62.5° C.) for 30 minutes and packaged in glass jars.

EXAMPLE VII

A milk-free concentrate formula may be prepared by emulsifying the following ingredients:

| | |
|---|---|
| Water | 75 kg |
| Sugar | 11 kg |
| Soya Oil | 6.5 kg |
| Soya Protein | 5 kg |
| Tapioca Dextrin | 1.5 kg |
| Disodium Phosphate | 300 g |
| Potassium Chloride | 300 g |
| Sodium Hypophosphite | 200 g |
| l-methionine | |
| Dimagnesium Phosphate | |
| Choline Chloride | |
| Ferrous Sulfate | |
| Inositol | |
| Zinc Sulfate | |
| Vitamin A Palmitate | 200 g |
| Cupric Sulfate | |
| Manganese Sulfate | |
| Thiamin Hydrochlorite | |
| Riboflavin | |
| Folic Acid | |

This product is packaged in cans, heated to 240° F. (115.5° C.) in an autoclave and maintained at that temperature for 3 minutes.

EXAMPLE VIII

Green beans may be prepared by cooking in a pressure cooker:

| | |
|---|---|
| Beans | 90 kg |
| Water | 8.8 kg |
| Salt | 760 g |
| Sodium Hypophosphite | 300 g |
| Sodium Nitrite | 40 g |

The product is canned, heated to 240° C. (115.5° C.) in an autoclave and maintained at that temperature for 5 minutes.

EXAMPLE IX

Whole kernel corn may be prepared by cooking in a pressure cooker:

| | |
|---|---|
| Whole Kernel Corn | 88 kg |
| Water | 9.4 kg |
| Sugar | 1.7 kg |
| Salt | 600 g |
| Sodium Hypophosphite | 300 g |

The product is canned, heated to 240° F. (115.5° C.) in an autoclave and maintained at that temperature for 5 minutes.

EXAMPLE X

Mashed carrots may be prepared by cooking in a pressure cooker:

| | |
|---|---|
| Carrots | 90 kg |
| Water | 8 kg |
| Sugar | 1.4 kg |
| Salt | 500 g |
| Sodium Hypophosphite | 100 g |

The product is canned, heated to 240° F. (115.5° C.) in an autoclave and maintained at that temperature for 5 minutes.

TABLE I

| BABY FOODS | | | | |
|---|---|---|---|---|
| | Protein[1] | Fat[2] | Carbohydrate[3] | C/P&F[4] |
| Cereals, precooked, dry other cereal products: | | | | |
| Barley, added nutrients | 13.4 | 1.2 | 73.6 | 5.0 |
| High protein, added nutrients | 35.2 | 3.7 | 48.1 | 1.2 |
| Mixed, added nutrients | 15.2 | 2.9 | 70.6 | 3.9 |
| Oatmeal, added nutrients | 16.5 | 5.5 | 66.0 | 3.0 |
| Rice, added nutrients | 6.6 | 1.6 | 80.0 | 9.8 |
| Teething biscuit | 11.1 | 2.3 | 78.0 | 5.8 |
| Desserts, canned: | | | | |
| Custard pudding, all flavors | 2.3 | 1.8 | 18.6 | 4.5 |
| Fruit pudding with starch base, milk and/or egg (banana, orange, or pineapple) | 1.2 | .9 | 21.6 | 10.3 |
| Dinners, canned - cereal, vegetable, meat mixture (approx. 2%–4% protein): | | | | |
| Beef noodle dinner | 2.8 | 1.1 | 6.8 | 1.7 |
| Chicken Noodle Dinner | 2.1 | 1.3 | 7.2 | 2.1 |
| Macaroni, tomatoes, meat and cereal | 2.6 | 2.0 | 9.6 | 2.1 |
| Split peas, vegetables, and ham or bacon | 4.0 | 2.1 | 11.2 | 1.8 |
| Vegetables and bacon, with cereal | 1.7 | 2.9 | 8.7 | 1.9 |
| Vegetables and beef, with cereal | 2.7 | 1.6 | 7.6 | 1.8 |
| Vegetables and chicken, with cereal | 2.1 | 1.4 | 7.7 | 2.2 |
| Vegetables and ham, with cereal | 2.8 | 2.2 | 8.3 | 1.7 |
| Vegetables and lamb, with cereal | 2.2 | 2.0 | 7.7 | 1.8 |
| Vegetables and liver, with cereal | 3.1 | .4 | 7.8 | 2.2 |
| Vegetables and liver, with bacon and cereal | 2.4 | 1.9 | 7.5 | 1.7 |

TABLE I-continued

BABY FOODS

| | Protein[1] | Fat[2] | Carbohydrate[3] | C/P&F[4] |
|---|---|---|---|---|
| Vegetables and turkey, with cereal | 2.1 | .8 | 7.2 | 2.5 |
| Fruits and Fruit products, with or without thickening, canned: | | | | |
| Applesauce | .2 | .2 | 18.6 | 46.5 |
| Applesauce and apricots | .3 | .1 | 22.6 | 56.5 |
| Bananas (with tapioca or cornstarch, added ascorbic acid), strained | .4 | .2 | 21.6 | 36.0 |
| Bananas and pineapple (with tapioca or cornstarch) | .4 | .1 | 20.7 | 41.4 |
| Fruit dessert with tapioca (apricot, pineapple, and/or orange) | .3 | .3 | 21.5 | 35.8 |
| Peaches | .6 | .2 | 20.7 | 25.9 |
| Pears | .3 | .1 | 17.1 | 42.7 |
| Pears and pineapple | .4 | .2 | 17.6 | 29.3 |
| Plums with tapioca, strained | .4 | .2 | 24.3 | 40.5 |
| Prunes with tapioca | .3 | .2 | 22.4 | 44.8 |
| Vegetables, canned: | | | | |
| Beans, green | 1.4 | .1 | 5.1 | 3.1 |
| Beets, strained | 1.4 | .1 | 8.3 | 5.5 |
| Carrots | .7 | .1 | 6.8 | 8.5 |
| Mixed vegetables including vegetable soup | 1.6 | .3 | 8.5 | 4.5 |
| Peas, strained | 4.2 | .2 | 9.3 | 2.1 |
| Spinach, creamed | 2.3 | .7 | 7.5 | 2.5 |
| Squash | .7 | .1 | 6.2 | 7.7 |
| Sweet potatoes | 1.0 | .2 | 15.5 | 51.7 |
| Tomato soup, strained | 1.9 | .1 | 13.5 | 6.7 |

[1] The weight of protein (grams) in a 100 gram sample.
[2] The weight of fat (grams) in a 100 gram sample.
[3] The weight of carbohydrate (grams) in a 100 gram sample.
[4] The weight of carbohydrate in a 100 gram sample divided by the weight of protein plus the weight of fat in that sample.

I claim:

1. A carbohydrate food product, resistant to the outgrowth of *Clostridium botulinum* and the formation of enterotoxin, containing an amount of a compound, selected from the group consisting of hypophosphorous acid and its nontoxic water-soluble salts, effective to inhibit growth of *Clostridium botulinum* and formation of enterotoxin in said food product.

2. The food product of claim 1 containing hypophosphorous acid.

3. The food product of claim 1 containing sodium hypophosphite.

4. The food product of claim 1 containing from about 500 ppm to about 3000 ppm of said compound.

5. The food product of claim 1 containing about 1000 ppm of sodium hypophosphite and about 40 ppm of sodium nitrite.

6. A carbohydrate baby food, that is resistant to the outgrowth of *Clostridium botulinum* and the formation of enterotoxin, containing an amount of a compound, selected from the group consisting of hypophosphorous acid and its nontoxic water-soluble salts, effective to inhibit growth of *Clostridium botulinum* and formation of enterotoxin in said baby food.

7. Honey, that is resistant to outgrowth of *Clostridium botulinum* and the formation of enterotoxin, containing an amount of a compound, selected from the group consisting of hypophosphorous acid and its nontoxic water-soluble salts, effective to inhibit growth of *Clostridium botulinum* and formation of enterotoxin in said honey.

8. The honey of claim 7 containing from about 500 ppm to about 3000 ppm of said compound.

9. The honey of claim 7 containing about 1000 ppm of sodium hypophosphite and 40 ppm of sodium nitrite.

10. A corn syrup, that is resistant to the outgrowth of *Clostridium botulinum* and the formation of enterotoxin, containing an amount of a compound, selected from the group consisting of hypophosphorous acid and its nontoxic water-soluble salts, effective to inhibit growth of *Clostridium botulinum* and formation of enterotoxin in said corn syrup.

11. The corn syrup of claim 10 containing from about 500 ppm to about 3000 ppm of sodium hypophosphite.

12. A method of inhibiting the formation of enterotoxin from *Clostridium botulinum* in carbohydrate food products which comprises the step of incorporating in the carbohydrate food products an amount of a compound, selected from the group consisting of hypophosphorous acid and its nontoxic water-soluble salts, effective to inhibit growth of *Clostridium botulinum* and formation of enterotoxin in said food products.

13. The method of claim 12 wherein from about 500 ppm to about 3000 ppm of said compound is incorporated in the carbohydrate food products.

* * * * *